Feb. 11, 1958   F. E. WARTERFIELD, JR   2,822,638
FISHING LURE
Filed Oct. 7, 1954
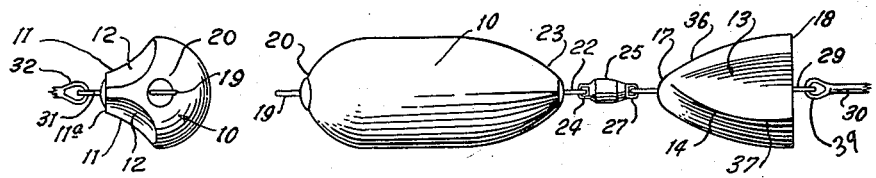
Fig.1.   Fig.2.
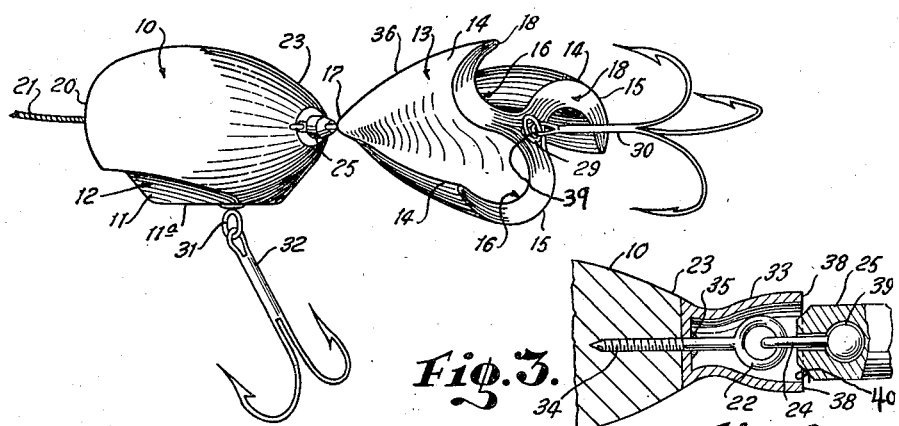
Fig.3.   Fig.6
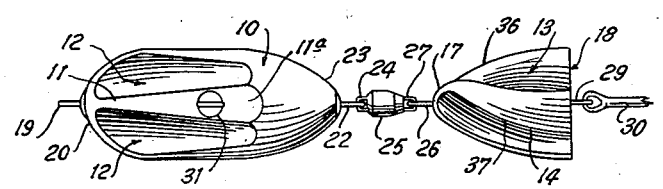   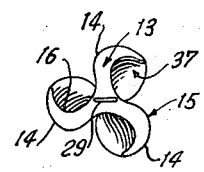
Fig.4.   Fig.5.
INVENTOR
Floyd E. Warterfield, Jr.
BY Austin Miller +
Howard E. Moore
ATTORNEYS

2,822,638

FISHING LURE

Floyd E. Warterfield, Jr., Dallas, Tex.

Application October 7, 1954, Serial No. 460,793

1 Claim. (Cl. 43—42.16)

This invention is concerned with a fishing lure and is particularly concerned with a novel form of fishing lure that is comprised of a rotatable member and a non-rotatable member, joined together by a swivel joint, wherein the non-rotatable element serves as a stabilizer and depth regulator and the rotatable element rotates vigorously when the lure is pulled through water.

It is a primary object of my invention to provide improved means for stabilizing and regulating the movement of a fishing lure, when the lure is pulled through the water.

Another object of this invention is to provide a fishing lure which is less likely to become entangled and fouled in weeds and other obstructions in the water, and has a stabilizing body thereon which maintains a predetermined horizontal position and depth in the water and has a rotatable element attached to the stabilizing body which rotates rapidly, causing bubbles which are attractive to game fish.

It is another object of my invention to provide a fishing lure that will not twist the fishing line attached to the lure. The fishing line is attached to the stabilizing member and since the stabilizing member will not rotate, the lure cannot twist the line.

It is another important object of my invention to provide a fishing lure comprised of a non-rotatable stabilizing member and a multi-vaned, spirally arranged rotatable member connected by a universal type swivel joint.

Another object of my invention is to provide such a fishing lure wherein a substantially bell-shaped guard is mounted on the rear end of the non-rotatable member. The bell-shaped guard extends outwardly over and around the swivel, thereby limiting the area of gyratory movement of the swivel and rotatable member. The bell-shaped configuration of the guard directs the flow of the water past the swivel and through the vanes of the rotatable element, thereby causing smoother and more rapid rotation thereof.

A further object of my invention is to provide a fishing lure with improved buoyancy action, whereby the water forces the stabilizing member upward toward the surface as the lure is pulled through the water, thus preventing fouling and dragging along the bottom.

A still further object of my invention is to provide means of adjusting the depth at which a lure will ride in the water, as it is pulled therethrough.

Other and further objects of my invention will become apparent upon reading the detailed specification hereinafter following, and by referring to the drawings attached hereto.

Fig. 1 is a front end view of the stabilizing element, said element being in a sidewise position, showing the relative position of the flutes and stabilizing fin thereon.

Fig. 2 is a top plan view of the fishing lure, including the non-rotatable stabilizing element and the rotatable element joined by a swivel connection.

Fig. 3 is a side perspective view of the fishing lure, with hooks attached thereto in operative position.

Fig. 4 is a bottom plan view of the fishing lure, showing the stabilizing fin and flutes on the non-rotatable element and the spiral vanes on the rotatable element.

Fig. 5 is a rear elevational view of the rotatable element showing the spiral arrangement of the vanes thereon.

Fig. 6 is an enlarged fragmentary cross-sectional elevational view of a modified form, wherein is shown a substantially bell-shaped guard attached to the rear side of the stabilizing element, and extending over the swivel connection between the stabilizing element and the rotatable element in position to limit lateral movement of the swivel joint.

The various parts shown in the drawings are indicated by numeral references, and like numerals indicate like parts throughout the various figures of the drawing.

The numeral 10 indicates the non-rotatable stabilizing body of the fishing lure, the preferable form of stabilizing element being generally torpedo in shape, as shown.

The stabilizing body 10 has a pair of longitudinally arranged, diametrically opposed flutes or grooves 12 formed on the underside thereof, as an integral part thereof. Each flute 12 is semi-elliptical in shape in action with their major axes lengthwise the member 10. The elongated flutes 12 slope from the front end 20 of member 10 toward the back end 23 of said member 10 in a downward and outward direction terminating at the bottom surface of member 10 intermediate its length. The lengths of flutes 12 are preferably greater than one-half the length of body 10. A downwardly extending longitudinal fin 11 is formed between the flutes 12. Fin 11 serves as a keel and stabilizer with its axis parallel to the longitudinal axis of member 10 to maintain non-rotatable member 10 in an upright position when pulled through water. When the lure is pulled through the water, the water passes through flutes 12 and downwardly therethrough, causing the member 10 to be buoyed up, depending upon the slope of the flutes. The fin 11 prevents the member 10 from rotating as the water passes through flutes 12.

As shown in Fig. 4, the width of fin 11 increases as the fin extends rearwardly and as the width of the flutes 12 diminish.

Thus it is seen that body member 10 is a non-rotatable stabilizing member with integrally formed flutes thereon, and an integrally formed stabilizing fin extending outwardly therefrom to form a keel similar to the keel of a boat. The novel construction of providing integral flutes 12 on the stabilizing body to form the fin 11 makes the member well balanced and stable when it moves through water. It is streamlined, and there is no necessity for attaching wings, vanes, or the like to the stabilizing member to give it stability and direction. Such attachments tend to make fishing lures clumsy to handle and are more easily fouled and hung in weeds, brush or other obstructions.

Water forced against the downwardly sloping contours of flutes 12 exerts an upward force upon the stabilizing member 10 and forces it upward toward the surface of the water. The depth at which the lure moves through the water may be regulated by varying the slope of flutes or grooves 12.

It will be seen how member 10 of my fishing lure serves as a stabilizer with buoyancy action when the lure is pulled through water.

The rotatable member 13, which is rotatably attached to trail the member 10, includes a plurality of integral, spirally pitched, vanes 14, each vane having a convex-concave contour. The outside of each vane 14 has a convex surface 15 and the inside of each vane 14 has a corresponding concave surface 16. The outside surface 36 of each vane 14 slopes backward in an increasing degree from the point of convergence at the front end 17 of member 13, as shown in Figs. 2, 3 and 4, with the greatest width of vanes 14 being at the back end 18 of member 13. The back end 18 of said member 13 is a flat planar surface cutting the body of member 13 off sharply at right angles to the longitudinal axis of the body of rotatable member 13, as shown in Figs. 2, 3, and 4.

Said vanes 14 are arranged in a pitched spiral pattern from the flat rear end 18 to the point of convergence at the front end 17, as best indicated at 37 in Fig. 5.

Non-rotatable stabilizing element 10 is provided with a fixed attachment eye 19 at the front end 20 thereof for attaching a fishing line 21 thereto. Fishing line 21 may be fixedly attached to the eye 19, since the member 10 does not rotate, but a swivel joint (not shown) may be attached between eye 19 and the fishing line 21, if desired.

An attachment eye 22 is fixed at the back end 23 of non-rotatable stabilizing member 10. Such eye 22 is hingedly engaged through eye 24, which eye 24 is rotatably mounted to swivel coupling 25 by means of a ball and socket joint, indicated at 39. The ball and socket joint 39 forms a universal coupling between the member 10 and the swivel coupling 25.

An attachment eye 26 is fixed at the front end 17 of rotatable member 13 and is hingedly engaged through eye 27, which is fixedly attached to the swivel coupling 25. The ball and socket joint 39 in swivel coupling 25 permits the rotatable element 13 to rotate with relation to the member 10 when the lure is pulled through the water, and permits the rotatable element 13 to move in a gyratory motion as it rotates, thus stirring the water and creating a trail of bubbles. This is especially attractive to game fish.

Attachment eye 29 is fixed to the back end 18 of rotatable member 13 for hingedly attaching the eye 39 of multiple hook 30 to rotatable member 13. Said hooks 30 rotate with rotatable member 13.

Attachment eye 31 is fixed to the bottom 11a of non-rotatable member 10 for attaching hooks 32 to the rudder-like fin 11. The hooks 32 are preferably attached at the approximate gravitational center of stabilizing member 10 so that the stabilizing element will be balanced.

In Fig. 6 is shown a modified form of my invention in which a bell-shaped or cup-like guard 33, carried by the non-rotatable member 10, is secured to the back end 23 of the non-rotatable stabilizing member 10 and extends out over the hingedly attached eyes 22 and 24. The back end 38 of guard 33 extends backward and outward to a position where it is engageable with the coupling member 25, thus limiting the gyratory movement of the rotatable member 13 as it moves through the water. The swivel member 25 may make contact with the back end 38 of the guard 33 as the swivel 25 moves in a gyratory pattern about universal swivel joint 39, as the lure is pulled through the water.

The guard 33 is secured to the rear end 23 of member 10 by threads on the shank 34 of eye 22. The threaded end of shank 34 is passed through a hole in the closed end of guard 33 and threadedly engaged in the body of member 10, as shown in Fig. 6. The guard 33 may then be fixed with relation to shank 34 by soldering or welding, such as shown at 35. If desired, the weld 35 could be eliminated and thus leaving shank 34 adjustably engaged in member 10, whereby the amount of lateral movement of swivel member 25 may be adjustable. The amount of lateral movement of swivel member 25 could thus be increased or decreased by screw adjustment of the shank 34 inwardly or outwardly with relation to member 10, thereby varying the contact of the beveled surface 40, on member 25 with the guard 33. In such modification the guard 33 would preferably be fixedly attached to member 10.

The guard 33 also protects the universal swivel joint 25 from being fouled with weeds and other obstructions when pulled through the water, directs the flow of the water into the vanes 14 as it passes the non-rotatable member 10, thus causing the member 13 to spin more freely and more rapidly as the lure is pulled through the water.

I have thus provided a fishing lure, comprised of two members, one member being non-rotatable while the other rotates rapidly, and at the same time moves in a gyratory motion, thus creating a wide wake of bubble to attract the fish. It also makes a fish-attracting noise as it moves through the water.

The novel arrangement of the flutes and fin as an integral part of the body of the non-rotatable member causes the lure to have a tendency to rise toward the surface of the water and to be buoyed up near the surface to attract game fish in search for food. The stabilizing member does not rotate, and therefore prevents the line from twisting and fouling.

In operation, the stabilizing member 10 clears a path for the rotating member 13, as the lure moves through the water. The backward diverging slope of the rotatable member is such that generally any obstruction will glance off the edge of the rotating vanes 14 and will not become entangled in the trailing hooks.

The tendency the lure has to rise to the surface at all times helps to prevent the hooks, attached to the bottom of the stabilizing member, from becoming fouled in weeds. The buoyancy action of the stabilizing member prevents the lure from dragging along the bottom of the body of water, making it especially suitable for shallow water fishing.

However, it will be understood that the lure could be caused to ride deeper in the water by lessening the angle of slope of the flutes 12 from front to rear.

While I have herein shown and described my invention, it is obvious that structural changes may be made without departing from the spirit of the invention, and I therefore do not desire to be limited to the precise forms beyond the limitations as may be imposed in accordance with the scope of the following claim.

I claim:

In a fishing lure, a body; said body having a pair of longitudinal grooves formed on one side thereof; a longitudinal fin separating the grooves, the grooves being sloped outwardly from front toward the rear of the body and terminating intermediate the ends of the body; a rotatable member carried by the body; a universal joint connecting the body and the rotatable member; a plurality of radially disposed, pitched, spiralled vanes integrally formed on the rotatable member, each vane having a convexo-concave contour; and the outer edges of the vanes being curved from an end of maximum diameter to a point of convergence at the opposite end adjacent the point of attachment to the body, the said body being generally elliptical in shape and converging to an end of minimum diameter adjacent the point of attachment to the rotatable member.

References Cited in the file of this patent

UNITED STATES PATENTS

| 756,009 | Flegle | Mar. 29, 1904 |
| 1,060,873 | Wilson | May 6, 1913 |
| 1,222,774 | Leonard | Apr. 17, 1917 |
| 1,268,635 | Shuff | June 4, 1918 |
| 1,802,295 | Wear | Apr. 21, 1931 |
| 1,932,622 | Gruenbagen | Oct. 31, 1933 |
| 1,996,776 | Strausborger | Apr. 9, 1935 |
| 2,507,098 | Fischler | May 6, 1950 |
| 2,545,398 | Warobiew | Mar. 13, 1951 |
| 2,592,445 | McCarthy | Apr. 8, 1952 |
| 2,606,387 | Garner | Aug. 12, 1952 |

FOREIGN PATENTS

| 363,303 | Great Britain | Dec. 17, 1931 |
| 842,172 | France | Feb. 27, 1939 |